July 10, 1951 V. NOUZÁK 2,560,238
ARRANGEMENT FOR AUTOMATICALLY DISENGAGING
A MECHANISM BY STOP ACTION
Filed March 11, 1949
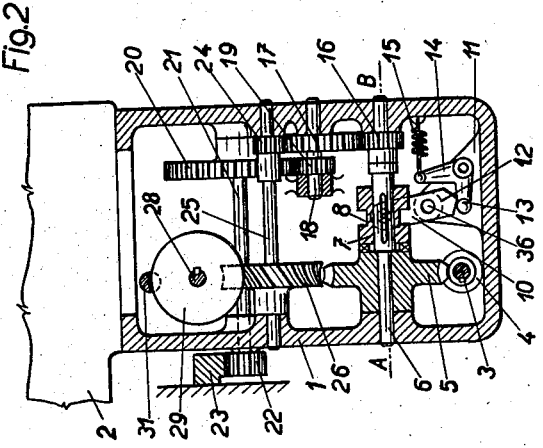
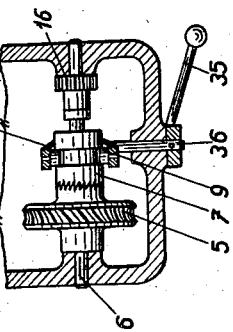
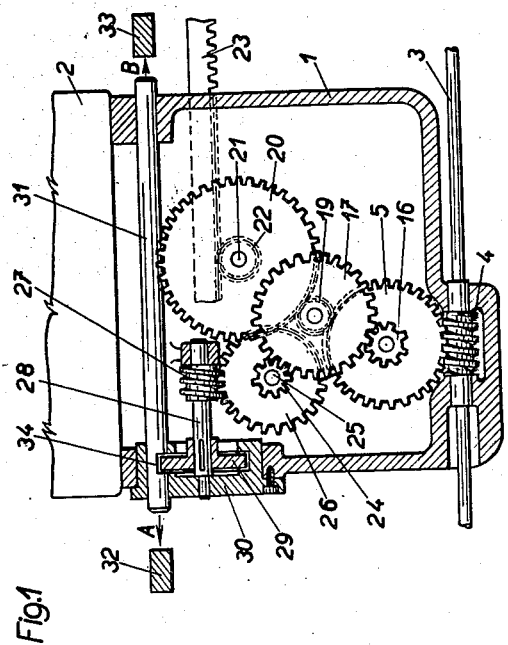
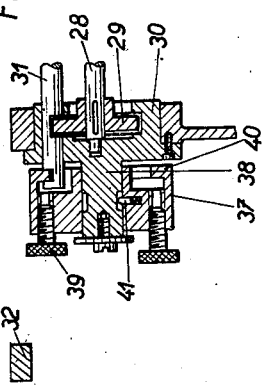
INVENTOR
Vladimir Nouzák
BY

Patented July 10, 1951

2,560,238

UNITED STATES PATENT OFFICE

2,560,238
ARRANGEMENT FOR AUTOMATICALLY DISENGAGING A MECHANISM BY STOP ACTION

Vladimír Nouzák, Prague, Czechoslovakia, assignor of one-half to United Machine Tools Factories, National Corporation, Prague, Czechoslovakia Application March 11, 1949, Serial No. 80,798
In Czechoslovakia March 19, 1948

3 Claims. (Cl. 192—143)

My invention relates to stop mechanisms for the automatic disengagement of the longitudinal feed of machine parts such as of the carriage in machine tools. In known mechanisms of that type the carriage or other movable machine part or any element integral therewith strikes against a stop member adjustably mounted on the bed or frame of the machine and the occurring reaction results in an increase of the torque of the driving mechanism above a certain admissible limit predetermined by the tension of an elastic member such as a spring interposed in said driving mechanism and in an disengagement of the driving parts of the mechanism from its driven parts so that the movement of the carriage or other machine part is interrupted.

The said known stop mechanisms have the disadvantage that relatively great forces are necessary to effect the disengagement of the driving means and accordingly the stop mechanism and its parts required a heavy and strong construction. The considerable disengagement forces caused elastic deformations within the mechanism and the following reaction resulted in a leaping back of the carriage or the like from its originally stopped position. The said great forces often also caused permanent deformations within the mechanism which detrimentally affected the quality of the machining operations.

The object of the present invention is to avoid the said and other disadvantages particularly to enable the actuation of the stop mechanism with relatively small forces thus preventing deformations of the mechanism and unfavorable effects upon the machining operations.

An embodiment of the arrangement according to the present invention is illustrated by way of example in the accompanying drawing showing in Figs. 1 to 4 diagrammatically the feed mechanism of a lathe.

Fig. 1 shows a longitudinal section through the carriage box,

Fig. 2 a respective sectional side view,

Fig. 3 a fragmentary section along line A—B, in Fig. 2, and

Fig. 4 a modified embodiment of the device for the control of the arresting rod.

The slide box 1 connected with the saddle 2 of the slide is driven by a feed drive shaft 3 through a worm 4 which is rotatably and secured against axial displacement supported in the slide box. The worm 4 meshes with a worm wheel 5 arranged rotatably on the shaft 6. The hub of said worm wheel 5 is provided with sloped teeth which engage cooperating sloped teeth arranged upon a clutch slidably keyed to said shaft 6. Said clutch 7 is provided with a circumferential slot 8 with which cooperates through slide stones 9 a shifting fork 10 mounted on the shaft 36 which rests rotatably in the suport 11 within the slide box. Said shifting fork 10 is provided with an arm 12 having at its one end two mutually inclined faces cooperating with a pulley 13 which is rotatably mounted on one arm of a two-armed lever 14 swingably resting in the support 11. To the other arm of said lever 14 one end of a tension spring 15 is attached its other end being attached to the wall of the slide box 1. A gear 16 keyed to the shaft 6 meshes with a gear 17 which is mounted on a shaft 18 together with another gear 19 meshing with a gear 20 fixed on shaft 21. A pinion 22 keyed to this same shaft 21 meshes with a toothed rack 23 fixed on the machine bed or frame. The said gear 17 drives another gear 24 keyed on shaft 25 upon which also a worm wheel 26 is fixed meshing with the worm 27 keyed on the shaft 28 which rests in the slide box. A brake disc 29 is slidably keyed to said shaft 28 and is provided with frictional surfaces arranged on both frontal faces of the disc. Said frictional surfaces cooperate with frictional surfaces arranged within a brake casing 30 fixed in the slide box, a certain axial clearance being provided for between said brake disc 29 and said frictional surfaces in said casing 30. An arresting rod or bar 31 slidably supported in the slide box and extending with both its ends beyond the slide box cooperates with stops 32 and 33, respectively which are adjustably fixed on the machine bed or frame. Said bar 31 is provided with a slot 34 into which extends the brake disc 29 with its circumference.

Fig. 4 shows a somewhat modified embodiment wherein the arresting bar 31 is controlled indirectly by a stop drum 37 arranged rotatably and slidably on a pivot 38 which is integral with the brake casing 30. On the circumference of said drum 37 adjustable stop screws are arranged, one of which is always cooperating with a stop 32 fixed on the machine bed. The drum 37 is connected with the bar 31 by means of its flange 40 which is engaged by the claw provided in the bar 31.

The individual drum positions are secured by a spring loaded latch 41 provided in the drum body and cooperating with respective notches arranged on the pivot 38.

The above described device operates as follows:

The feed drive shaft 3 is driven in a known manner not shown in the drawing by gears from the working spindle of the machine over the feed box or by an independent drive source. By the action of the worm 4, worm wheel 5 and gears 16, 17, 19, 20, the pinion 22 is driven in mesh with the stationary toothed rack 23 thus imparting the feed motion to the slide 2 for example in the direction of the arrow A. During this operation the feed clutch 7 engages the worm wheel 5 and is held in its engaged position by the spring 15 acting upon the two-armed lever 14 whose pulley 13 cooperates with one of the two inclined faces provided on the arm 12 of the shifting fork 10. The force of the spring 15 is so adjusted as to suit the maximum cutting resistance of the tool. The feed motion of the slide 2 will last until the left-hand frontal face of the end of the arresting bar 31 abuts against the stop 32.

As soon as the arresting bar 31 touches the stop 32 a relative axial shift of said bar will occur against the feed motion of the slide, so that the slot 34 is displaced and urges the rim of the brake disc 29 against the right-hand frictional surface of the brake casing 30. The arising friction causes a stoppage of the rotational movement of the brake disc 29 and of the worm 27 connected therewith. By the action of the gearing 26, 24, 17 and 16 the rotation of the shaft 6 and of the slidable clutch 7 will be stopped. The worm gear 5, however, continues to be rotated by the worm 4 mounted upon the shaft 3. This results in an axial displacement of the clutch 7 away from the wheel 5 through the action of the inclined coupling teeth and the shifting fork 10 with arm 12 is turned about the pivot 36. The left-hand inclined face of the arm 12 acts upon the pulley 13 overcoming the force exerted by the spring 15, the tip of the arm 12 passes beyond its unstable position and by the following action of the pulley 13 on the right-hand inclined face of the arm 12 the disengaged clutch 7 is held in its extreme right-hand position abutting against a shoulder of the shaft 6. Thereby the connection between the driving parts and the driven part of the feed mechanism is permanently interrupted and the worm wheel 5 turns freely on the shaft 6.

The coupling may be re-engaged by the hand lever 35 acting upon the shaft 36 of the shifting fork thus bringing about a further feed motion of the slide. The device for disengaging the clutch 7 acts for both direction of feed. If the slide 2 moves in the direction of the arrow B then the arresting disengaging bar 31 cooperates with the stop 33, the resulting function being identical with that described above.

The main feature of the present invention, therefore, consists therein that contrary to the known arrangements wherein the disengagement of the clutch within the stop mechanism is effected by the full feed force the disengagement of the clutch in the arrangement according to the invention is effected by a substantially smaller force developed in an auxiliary braking device and by a conveniently selected additional gearing such as 24, 25, 26, 27 between the axis 21 of the pinion 22 and the axis of the brake drum 29. If, for example, the ratio of said gearing is 1 to 80 then with a friction coefficient of 0.1 between the braking surfaces the force acting on the stop will be reduced in the following proportion:

$$\frac{1}{0.1} \cdot \frac{1}{80} = \frac{1}{8}$$

Thus when steel having a tensile strength of 60 kg./mm.$^2$ and a maximum chip cross sectional area of 12 mm.$^2$, is machined on the lathe the feed force is about 800 kg. In the arrangement according to the present invention, the stop 32 or 33 is under the action of a force eight times smaller, that is only 100 kg. against 800 kg. in the old arrangements.

While a specific embodiment of my invention has been shown and described in detail to illustrate the application of the principles of my invention it will be well understood that the same may be otherwise embodied without departing from such principles and may be utilized in machines other than machine tools.

What I claim as my invention is:

1. Stop mechanism for automatic disengagement of longitudinal feed, comprising in combination a feed drive shaft, a stationary rack, a pinion cooperating with said rack, a feed gearing between said feed drive shaft and said pinion, a feed clutch within said feed gearing automatically disengaging at a predetermined torque, a slide box housing said gearing, an additional gearing within said slide box, said additional gearing shunted to the feed gearing beyond said feed clutch, a brake gear attached to said additional gearing, an arresting rod axially extending in the direction of feed, said arresting rod being slidably mounted in the slide box and adapted to engage and disengage said brake gear, and at least one stop member in the axial direction of the arresting rod to cooperate therewith.

2. Stop mechanism for automatic disengagement of longitudinal feed, comprising in combination a feed drive shaft, a stationary rack, a pinion cooperating with said rack, a feed gearing between said feed drive shaft and said pinion, a disengageable feed clutch within said feed gearing, a slide box housing said gearing, an additional gearing within said slide box, said additional gearing shunted to the feed gearing beyond said feed clutch, a brake gear attached to said additional gearing, an arresting rod axially extending in the direction of feed, said arresting rod being slidably mounted in the slide box and adapted to engage and disengage said brake gear, at least one stop member in the axial direction of the arresting rod to cooperate therewith, and disengaging means for said feed clutch to effect its disengagement when the additional gearing and the connected feed gearing is stopped by the action of said brake gear.

3. Stop mechanism for automatic disengagement of longitudinal feed, comprising in combination a feed drive shaft, a stationary rack, a pinion cooperating with said rack, a feed gearing between said feed drive shaft and said pinion, a disengageable feed clutch within said feed gearing, a slide box housing said gearing, an additional gearing within said slide box, said additional gearing shunted to the feed gearing beyond said feed clutch, a brake disc rotated by said additional gearing, two stationary braking surfaces within the slide box each cooperating with one face of the brake disc, the brake disc being slidable in axial direction between said braking surfaces, an arresting rod axially extending in the direction of feed, said arresting rod being slidably mounted in the slide box and adapted to engage the brake disc to effect its axial displacement and its cooperation with one of the two braking surfaces, at least one stop member in the axial direction of the control rod to cooperate therewith, and disengaging means for said feed clutch to effect its disengagement when the additional gearing and the connected feed gearing is stopped by the braking action of said brake disc.

VLADIMÍR NOUZÁK.

REFERENCES CITED

The following references are of record in the file of this patent:

UNITED STATES PATENTS

| Number | Name | Date |
| --- | --- | --- |
| 1,200,876 | Ruetschi | Oct. 10, 1916 |
| 2,187,272 | Kochner | Jan. 16, 1940 |